Jan. 30, 1923.
H. C. MARMON.
HEATED ROLL FOR FLAKING MILLS.
FILED APR. 8, 1921.
1,443,629.
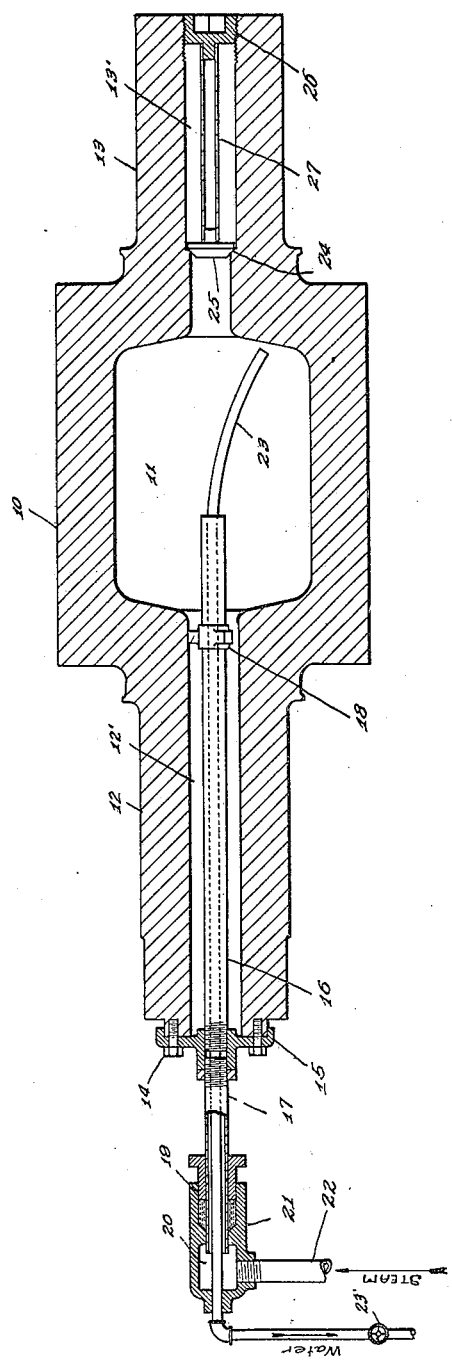
Inventor
Howard C. Marmon,
By Hood & Schley.
Attorneys Patented Jan. 30, 1923.

1,443,629

UNITED STATES PATENT OFFICE.

HOWARD C. MARMON, OF INDIANAPOLIS, INDIANA, ASSIGNOR TO NORDYKE & MARMON COMPANY, OF INDIANAPOLIS, INDIANA, A CORPORATION OF INDIANA.

HEATED ROLL FOR FLAKING MILLS.

Application filed April 8, 1921. Serial No. 459,780.

*To all whom it may concern:*

Be it known that I, HOWARD C. MARMON, a citizen of the United States, residing at Indianapolis, in the county of Marion and State of Indiana, have invented a new and useful Heated Roll for Flaking Mills, of which the following is a specification.

The object of my invention is to provide an improved steam-heated roll for the treatment of grains, for the preparation of food products.

The accompanying drawing, which is an axial section, illustrates my invention.

In the drawing, 10 indicates the main body, or grain-treating portion of my roll, in which is formed a comparatively large chamber 11. The main body 10 is provided at its ends with trunnions 12 and 13 which have bores 12′ and 13′ respectively.

Secured to the end of trunnion 12 by bolts 14 is a cap 15 into which are threaded pipes 16 and 17 extending from opposite faces of the cap. Pipe 16 is considerably smaller than bore 12′, is of sufficient length to project well into chamber 11, and is supported near its inner end by a spider 18 the ends of the arms of which contact with bore 12′. Pipe 17 is externally machined at its outer end and is projected through a packing gland 19 in which it rotates into a supply chamber 20 formed in a connector head 21 carried by a steam-supply pipe 22 which delivers into chamber 20.

Connector 21 carries a small drain pipe 23 which is of smaller diameter than the bore of pipes 16 and 17 and is projected therethrough. At its inner end, pipe 23 is laterally deflected so as to lie in chamber 11 well below the axis of roll 10, the deflection being of such character that, when bolts 14 are removed pipes 16 and 23 may be readily withdrawn from the roll so that the roll may be withdrawn from its bearings (not shown) so that it may be resurfaced or replaced.

The outer end of pipe 23 is carried to a point lower than the inner end and provided with a valve 23′.

Bore 13′ is provided at an intermediate point, with an annular seat 24 upon which is normally held a valve 25 by a plug 26 threaded into the outer end of bore 13′, the plug 26 and valve 25 being connected by a suitable rod or tube 27.

In operation steam enters chamber 11 through pipes 17 and 16 as roll 10 is rotated becomes condensed in chamber 11, and in a short time rises about the axis of the roll whereupon a gravity flow of the water is established through pipe 23. By an adjustment of valve 23′ the level of the water in chamber 11 is syphoned to approximately the level of the inner end of pipe 23 and there maintained by the syphon action of pipe 23 so that chamber 11 is kept practically free from water during continued operation.

I claim as my invention:

A grain mill roll comprising a hollow main body having an integral bored trunnion, a steam pipe for supplying heating steam to the interior of said roll projecting through said bore and into the main body of the roll, a drain pipe extending through said bored trunnion fitting within said steam supply pipe, projecting into said hollow main body and being laterally deflected at its inner end, means for supporting the inner end of said steam pipe, a cap closing the end of said trunnion and supporting said steam pipe and a packing gland associated with the outwardly projecting steam pipe and carried by a steam supply pipe whereby the steam pipe in the bore may rotate with the roll while the drain pipe may remain stationary.

In witness whereof, I have hereunto set my hand at Indianapolis, Indiana, April, A. D. one thousand nine hundred and twenty-one.

HOWARD C. MARMON.

Witnesses:
F. E. MOSDORIC.
E. C. BADGER.